US006993740B1

(12) United States Patent
Bergamaschi et al.

(10) Patent No.: US 6,993,740 B1
(45) Date of Patent: Jan. 31, 2006

(54) METHODS AND ARRANGEMENTS FOR AUTOMATICALLY INTERCONNECTING CORES IN SYSTEMS-ON-CHIP

(75) Inventors: Reinaldo A. Bergamaschi, Tarrytown, NY (US); Subhrajit Bhattacharya, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/542,024

(22) Filed: Apr. 3, 2000

(51) Int. Cl.
*G06F 17/50* (2006.01)

(52) U.S. Cl. ............................ 716/12; 716/13; 716/14

(58) Field of Classification Search ................ 716/1–6, 716/12–18; 324/765
See application file for complete search history.

(56) References Cited

U.S. PATENT DOCUMENTS 4,638,442 A * 1/1987 Bryant et al. ................. 716/14
4,928,278 A * 5/1990 Otsuji et al. ................ 714/700
5,519,630 A * 5/1996 Nishiyama et al. ........... 716/17
5,526,276 A * 6/1996 Cox et al. ..................... 716/17
5,526,277 A * 6/1996 Dangelo et al. ............... 716/3
5,910,898 A * 6/1999 Johannsen ..................... 716/1
5,949,691 A * 9/1999 Kurosaka et al. .............. 716/5
6,083,271 A * 7/2000 Morgan ......................... 716/1
6,086,626 A * 7/2000 Jain et al. ...................... 716/5
6,301,687 B1 * 10/2001 Jain et al. ...................... 716/3
6,360,352 B2 * 3/2002 Wallace ......................... 716/2
6,425,109 B1 * 7/2002 Choukalos et al. ............ 716/1
6,477,691 B1 * 11/2002 Bergamashi et al. .......... 716/12
6,567,957 B1 * 5/2003 Chang et al. .................. 716/4

OTHER PUBLICATIONS

A.M. Rincon et al., "Core Design and System-on-a-Chip Integration", IEEE Design & Test of Computers, pp. 26-35, Oct./Dec./. 1997.*

"VSI Alliance Architecture Document", Version 1.0, VSI Alliance, 1997.

A.M. Rincon et al., "The Changing Landscape of System-on-a-Chip Design", IBM MicroNews, vol. 5, No. 3, pp. 1-9, IBM Microelectronics, 3rd Quarter, 1999.

"The CoreConnect Bus Architecture", IBM Corporation, pp. 1-8, 1999.

A.M. Rincon et al., "Core Design and System-on-a-Chip Integration", IEEE Design & Test of Computers, pp. 26-35, Oct./Dec., 1997.

P. Schindler et al., "IP Repository, A Web based IP Reuse Infrastructure", IEEE Custom Integrated Circuits Conference, pp. 415-418, May, 1999.

R.E. Bryant, "Graph-Based Algorithms for Boolean Function Manipulation", IEEE Transactions on Computers, vol. C-35, No. 8, Aug. 1986, pp. 677-691.

W.P. Birmingham et al., "MICON: Automated Design of Computer Systems", Engineering Design Research Center, Carnegie Mellon University, Pittsburgh, PA.

* cited by examiner

*Primary Examiner*—Matthew Smith
*Assistant Examiner*—Naum B. Levin
(74) *Attorney, Agent, or Firm*—Ference & Associates

(57) ABSTRACT

A method and algorithms for creating correct-by-construction interconnections among complex intellectual property (IP) cores with hundreds of pins. The methods contemplated herein significantly reduce the time, complexity and potential for errors associated with systems-on-chip (SoC) integration.

12 Claims, 5 Drawing Sheets

```
COMPONENT PowerPC401 PROPERTIES{

    COMPOSITE_PROPERTY INTERFACE_DEF{
     PROPERTY BUS_TYPE: {PLB, OCM, DCR, ect.};

     PROPERTY INTERFACE_TYPE: {MASTER, ISOCM, DSOCM, SYSTEM, EIC., I.SSD, JTAG,...};

     PROPERTY FUNCTION_TYPE: {READ_OR_WRITE, READ, WRITE, INTERRUPT, FETCH,...};

     PROPERTY OPERATION_TYPE : { ACKNOWLEDGE, BUSY, ERROR, VALID, ABORT, ENABLE,
                                 GUARDED_TRANSFER, COMPRESSED_TRANSFER, REQUEST,
                                SIZE, BYTE_ENABLE, ADJUST, HOLD,...}

     PROPERTY DATA_TYPE: { ADDRESS, DATA, PRIORITY_DATA, INSTRUCTION,...};

     PROPERTY RESOURCE_TYPE: {BUS, WRITE_BUS, READ_BUS,...};

     PROPERTY PIN_GROUP/L: {DCU, ICU, IN, OUT, CONROL,...};
    };

    PROPERTY CONNECTION_LOGIC: {CONCAT, OR, AND, XOR, NOT };

    pin ICU_plhRequest {
        INTERFACE_DEF= {PLB, MASTER, FETCH, REQUEST, INSTRUCTION, BUS, ICU };
    };
    pin PLB_dcuAddrAck{
        INTERFACE_DEF= {PLB, MASTER, READ_OR_WRITE, ACKNOWLEDGE, ADDRESS,
                        BUS, DCU};
    };
    pin PLB_icuRdDBus{
        INTERFACE_DEF= {PLB, MASTER, READ, NA, DATA, BUS, ICU};
    };
    pin DCR_cpuAck{
        INTERFACE_DEF= {DCR, NA, READ_OR_WRITE, ACKNOWLEDGE, DATA, NA, CONTROL};
        CONNECTION_LOGIC= { OR };
    };
    ......
    ......
```

FIG. 3

METHODS AND ARRANGEMENTS FOR AUTOMATICALLY INTERCONNECTING CORES IN SYSTEMS-ON-CHIP

FIELD OF THE INVENTION

The present invention generally relates to methods and arrangements for interconnecting cores in systems-on-chip (SoCs).

BACKGROUND OF THE INVENTION

The reuse of pre-designed and pre-verified Intellectual Property (IP) blocks or cores has been identified heretofore as something that can enable very large systems-on-chip designs. However, the lack of appropriate tools and the increasing complexity of such cores makes them inherently difficult and error-prone to use. One of the main problems in using cores is the generation of all interconnections among them.

Of late, there have been profound, fundamental changes in the way very large scale integration (VLSI) systems are designed. The use of IP blocks or cores, in many different forms (hard, soft, firm) for SoC design is now being recognized as vital, if not an absolute necessity. Since these cores are pre-designed and pre-verified, a designer can concentrate on the complete system without having to worry about the correctness or performance of the individual components.

However, the lack of appropriate tools for using and integrating these cores has hindered meaningful progress. In fact, SoCs have grown considerably in size in recent years. It is currently commonplace to find SoC designs with well over thirty cores, with the percentage of core content varying from 50% to almost 95%. In this connection, reference is made to A. Rincon, W. Lee and M. Slatery, "The Changing Landscape of System-on-a-Chip Design" (IBM MicroNews, 3rd Quarter 1999, Vol. 5, No. 3, IBM Microelectronics) and A. Rincon, C. Cherichetti, J. Monzel, D. Stauffer and M. Trick, "Core Design and System-on-a-Chip Integration" (IEEE Design & Test of Computers, October/December 1997).

In order to understand the complexity of designing such systems, it is instructive to consider the complexity of the cores being used. Current cores can be extremely complex, with tens of thousands of gates and hundreds of pins. Designing using such cores has become a major problem because it requires designers to understand the functionality, interfaces and electrical characteristics of complex cores such as microprocessors, moving picture experts group (MPEG) decoders, direct memory access (DMA) controllers, etc. Moreover, the situation is further complicated by the fact that cores may be designed by different IP providers with different interface protocols, but need to be made interoperable with other cores.

An initial task in building an SoC is the integration of the cores into a top-level design, which can then be simulated and synthesized. This integration task, nowadays, is largely a manual and error-prone process because it requires the designer to understand the functionality of hundreds of pins in various cores and determine which pins should be connected together. This tedious manual process can lead to interconnection errors being introduced into the SoC which may not be detected until much later in the process. Problems such as these severely limit the advantages of using pre-designed IP blocks.

In view of the foregoing, a need has been recognized in connection with overcoming the shortcomings and disadvantages discussed above in connection with conventional arrangements.

SUMMARY OF THE INVENTION

In accordance with at least one presently preferred embodiment of the present invention, a "core interconnection engine" (CIE) is contemplated that automates the core integration task.

One task of a core interconnection engine (CIE) can be to create interconnections between pins of cores automatically, and to guide the designer in selecting interconnections when manual intervention is required. In order to achieve this, the CIE has to understand the characteristics of the pins in all cores and determine which pins can be connected together. Pins in different cores may be connected together if they exhibit compatible functional and electrical characteristics. The CIE preferably employes methods and algorithms for describing these characteristics as well as analyzing and comparing them.

The present invention broadly contemplates, in accordance with at least one presently preferred embodiment, a first aspect involving core and pin properties and a second aspect involving an interconnection engine, both of which are described in detail herein.

In one aspect, the present invention provides a method of interconnecting cores in systems-on-chip, the method comprising the steps of selecting at least two cores to be interconnected, each core having at least one associated pin; automatically assessing the compatibility of at least one pin of at least one core with respect to at least one pin of at least one other core; and automatically interconnecting the cores via establishing at least one connection between at least one pair of compatible pins.

In another aspect, the present invention provides a system for interconnecting cores in systems-on-chip, the system comprising: a selector which selects at least two cores to be interconnected, each core having at least one associated pin; an assessing arrangement which automatically assesses the compatibility of at least one pin of at least one core with respect to at least one pin of at least one other core; and a connecting arrangement which automatically interconnects the cores via establishing at least one connection between at least one pair of compatible pins.

Furthermore, in another aspect, the present invention provides a program storage device readable by machine, tangibly embodying a program of instructions executable by the machine to perform method steps for interconnecting cores in systems-on-chip, the method comprising: selecting at least two cores to be interconnected, each core having at least one associated pin; automatically assessing the compatibility of at least one pin of at least one core with respect to at least one pin of at least one other core; and automatically interconnecting the cores via establishing at least one connection between at least one pair of compatible pins.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 3 depicts a fragment of a PSF description for a core;

DESCRIPTION OF THE PREFERRED EMBODIMENTS

Figure 1:
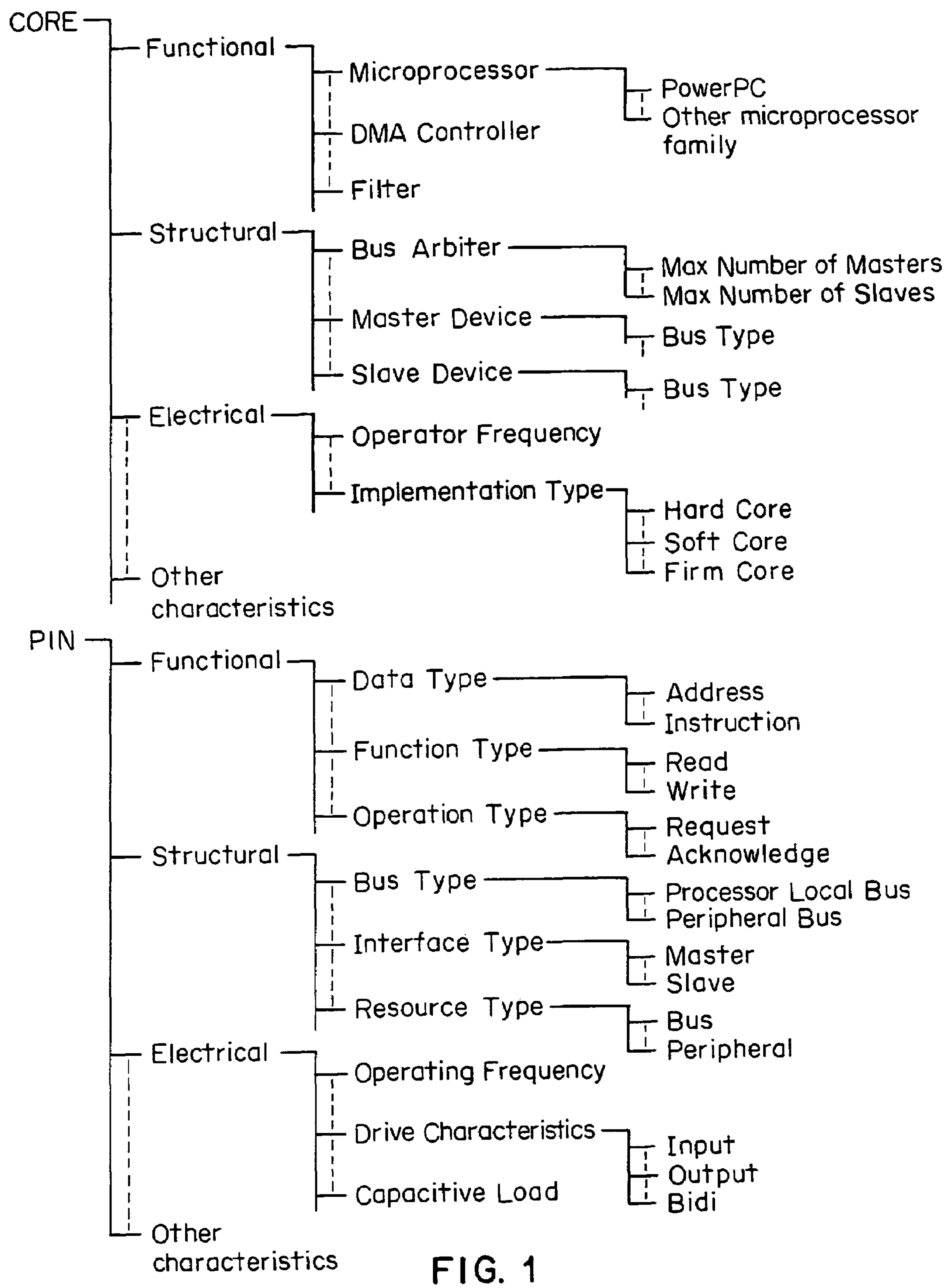
FIG. 1 depicts a classification tree for cores and pins.

One aspect of the present invention, in accordance with at least one presently preferred embodiment, involves core and pin properties.

In order to automatically generate interconnections among cores, it is preferable to encode the structural and functional characteristics of a component and its pins, in a manner that can be algorithmically processed by a computer program. In conventional design methodologies, the designer has to spend a large amount of time reading and understanding specification manuals just to find out how pins in different components need to be connected.

In a presently contemplated CIE, this information is encoded into properties attached to all components and their pins. The CIE preferably contains algorithms which can efficiently compare these properties and decide whether two pins should be connected (see further below).

Properties associated with a pin define the functionality and taxonomy of that pin. By assigning unique properties to all pins in all cores, it is possible to compare those properties and determine if the pins are compatible. In practice, it may not be possible nor desirable to assign unique properties to all pins, but still the CIE should find or help the designer find the right interconnection for a given pin. In P. Schindler, K. Weidenbacher and T. Zimmermann, "IP Repository, A Web based IP Reuse Infrastructure" (Proceedings of IEEE 1999 Custom Integrated Circuits Conference, May 1999), there is some discussion of classifying IPs using properties. However, this conventional approach only applies to IP properties, and there is no mention of pin properties. Further, the goal of this conventional approach was apparently to be able to query a database for IP blocks satisfying a set of properties. In contrast, the present invention, in accordance with at least one presently preferred embodiment, contemplates thes use of properties in a much broader sense to help in the automatic synthesis of SoCs. Moreover, the approach in Schindler et al., supra, does not provide any algorithm for searching and reasoning about the cores.

Preferably, a CIE formed in accordance with at least one embodiment of the present invention will contain a set of pre-defined properties sufficient for describing most bus-based architectures as well as unstructured architectures (not bus-based). The examples presented herebelow are based on the IBM Blue Logic™ Core Library and the CoreConnect™ bus architecture ("The CoreConnect™ Bus Architecture" IBM, 1999.) However, it should be understood that the embodiments of the present invention need not be limited to any specific bus architecture, nor to bus architectures in general.

Preferably, in accordance with an embodiment of the present invention, each core and each pin are classified according to their functional, structural and electrical characteristics, while such classification is encoded in properties that can be processed by a computer program. The discussion immediately herebelow relates to classification methods while the encoding and the algorithms for automatic processing are presented further below.

Several characteristics of cores and pins can be identified that can be used for classification of the cores and pins. FIG. 1 illustrates an example of such a classification tree for cores and pins. It will be appreciated, in FIG. 1, that a tree structure is depicted and that categories progress from general to specific, starting from the left and proceeding to the right.

Figure 2:
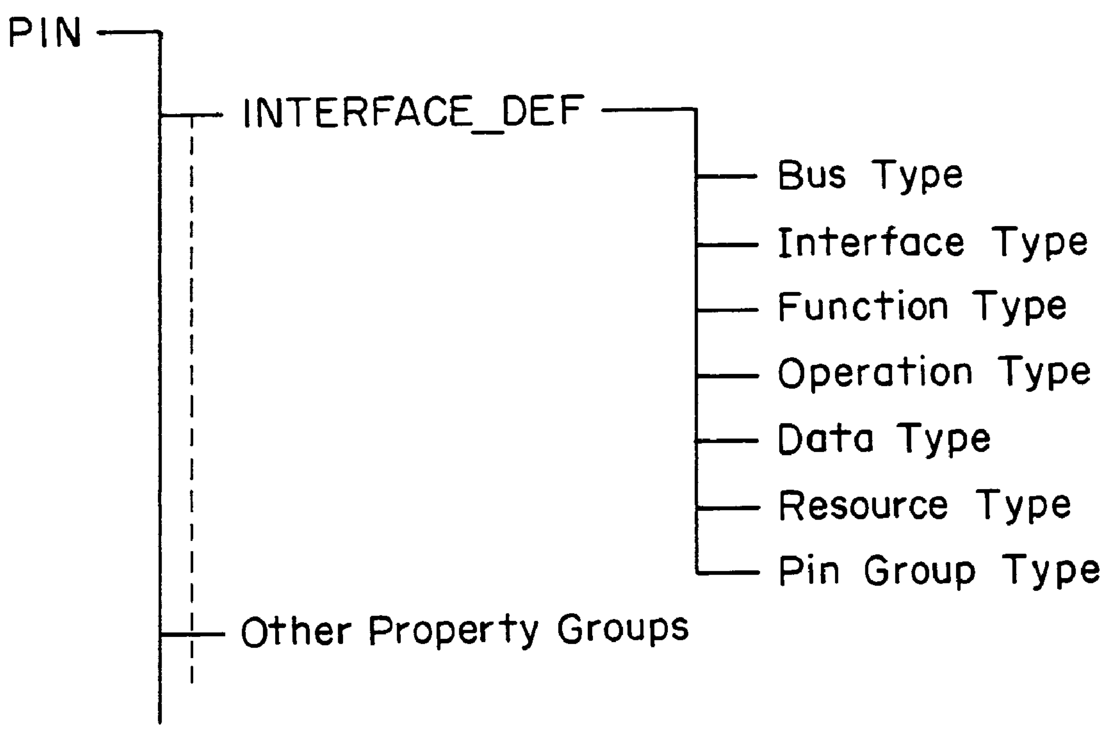
FIG. 2 depicts a pin property group.

Preferably, properties will also be grouped according to specific purposes. For example, one can select a set of properties which encapsulate all the information required for interconnecting pins, or for generating interface logic. FIG. 2 shows an example of a pin property group called INTERFACE_DEF that encapsulates all properties required by the CIE to determine whether two pins can be connected together.

Essentially, the specific branches and leaves of the classification trees are generic and can be organized and named in any way. Preferably, a CIE will contain algorithms which parse the property trees and groups and encode them in a manner that can be computer processed and used for reasoning.

Based on the IBM Blue Logic™ Core Library utilizing the CoreConnect™ bus architecture (discussed above) and other external cores, it has been found that most pins can be classified for interconnection purposes according to the following functional and structural properties (this is the INTERFACE_DEF group shown in FIG. 2):

- BUS_TYPE: the type of bus that the pin interfaces to. This can assume values such as, PLB (processor local bus), OPB (on-chip peripheral bus), ASB (AMBA system bus), APB (AMBA peripheral bus), etc.
- INTERFACE TYPE: the type of interface represented by the pin, e.g., MASTER, SLAVE.
- FUNCTION_TYPE: the function implemented by the pin, e.g., READ, WRITE, INTERRUPT. This pin could be one of several pins responsible for implementing the function.
- OPERATION_TYPE: the operation performed by the pin as part of the function specified in FUNCTION_TYPE, e.g., REQUEST, ACKNOWLEDGE.
- DATA_TYPE: the type of data manipulated by the function, e.g., ADDRESS, INSTRUCTION, DATA.
- RESOURCE_TYPE: the system resource used when the function specified by FUNCTION_TYPE is executed, e.g., BUS, PERIPHERAL.
- PIN_GROUP: property used to indicate grouping of pins in the same interface.

For example, pin ICU_plbRequest on the PowerPC∩ 401 is asserted by the Instruction Cache Unit (ICU) inside the PowerPC, to request an instruction fetch across the read data bus. The PowerPC acts as a master device on the processor local bus (PLB). Given this information, the following properties for the pin in question

| | |
|---|---|
| BUS_TYPE = | PLB |
| INTERFACE_TYPE = | MASTER |
| FUNCTION_TYPE = | FETCH |
| OPERATION_TYPE = | REQUEST |
| DATA_TYPE = | INSTRUCTION |
| RESOURCE_TYPE = | BUS |
| PIN_GROUP = | ICU |

Within the CoreConnect Architecture, this ICU_plbRequest pin will be connected to the master request pin of the PLB Bus Arbiter. The PLB Arbiter core PLB_BUS_4M has four sets of inputs, each set representing the group of pins associated with a Master device, since this arbiter core can support a maximum of 4 master devices. There are four request pins in this core, namely: M0_request, M1_request, M2_request and M3_request. Their properties are as follows:

| | |
|---|---|
| BUS_TYPE = | PLB |
| INTERFACE_TYPE = | MASTER |
| FUNCTION_TYPE = | * (wild card) |
| OPERATION_TYPE = | REQUEST |
| DATA_TYPE = | * |
| RESOURCE_TYPE = | BUS |
| PIN_GROUP = | M0, or M1, or M2, or M3 respectively |

Certain properties can be further classified as "Global" or "Local", depending on their scope. A property used for associating pins in different cores is called a Global property. A property used for associating pins in the same core is called a Local property.

For example, in the above set, property PIN_GROUP is a Local property whereas all others are Global. All pins in core PLB_BUS_4M which have PIN_GROUP=M0 are identified as belonging to the set of pins associated with master number 0 (which is a local characteristic of those pins). Similarly, all pins in PowerPC™ 401 which have PIN_GROUP=ICU are identified as belonging to the set of pins associated with the Instruction Cache Unit or ICU (which is a local characteristic of those pins). The local and global classification will be used by the interconnection engine algorithm described in Section III.

The CIE preferably uses a specialized language for specifying properties on cores and pins. This language is called PSF, for "Property Specification Language". A PSF description is preferably associated with a core and contains the property definitions and values for all properties attached to the core and all its pins. FIG. 3 presents a fragment of a PSF description for a PowerPC 401 core showing the INTERFACE_DEF group of properties.

The PSF language allows properties to be declared individually as well as in a set. A property set is called a Composite_Property, which is formed by one or more individual properties. In FIG. 3, INTERFACE_DEF is a property set, and CONNECTION_LOGIC is an individual property.

The PSF syntax requires first that a property be declared, which involves declaring a property name and a list of values that the property can assume when associated with the core or any of its pins. After the property declarations, they are assigned values and attached to the core or its pins. In FIG. 3, for example, pin DCR_cpuAck has composite property INTERFACE_DEF with values {BUS_TYPE=DCR}, {INTERFACE_TYPE=NA/not applicable}, {OPERATION_TYPE=ACKNOWLEDGE}, etc., and individual property CONNECTION_LOGIC with value OR.

A property is defined as a LOCAL property by adding the '/L' after the property declaration, otherwise the property is GLOBAL. In FIG. 3, property PIN_GROUP is a local property and all others are global.

For any given core to be usable by a CIE in accordance with at least one embodiment of the present invention, it will preferably have properties associated with itself and all its pins. Once that is available, that core can be used by the CIE and automatically connected to other cores. The IP or core provider is responsible for defining the properties for all its cores and pins, in accordance to the function of each pin and how they should be interconnected in a system. The system designer does not need to understand the details of the cores or their properties in order to be able to connect them using the CIE. This approach thus would appear to make the CIE one of the first enabling technologies for plug-and-play use and re-use of cores in any architecture.

The disclosure now turns to another aspect of the present invention, in accordance with at least one presently preferred embodiment, involving an interconnection engine.

Properties are preferably used for establishing relationships between pins of different cores. By comparing properties on pins, a CIE can decide whether a pin is compatible with another. "Compatibility" is defined for specific relationships. For example, two pins may be compatible from an interconnection point of view, but may be incompatible from an electrical point of view. For example, the two pins mentioned in Section II (ICU_plbRequest on the PowerPC and M0_Request on the PLB Arbiter) are compatible from an interconnection point of view and can be connected together. However, if their operating frequencies were, for example, 200 MHz and 100 MHz, they would not be compatible from an electrical point of view and would not be connected together.

In order to make these decisions, the CIE will preferably be able to reason about properties in a logical way, which is preferably accomplished by the two following techniques:

- Property encoding using Binary Decision Diagrams (BDDs)
- Property comparison and matching using logical operations on BDDs In order to be able to reason about the properties automatically in a logical way via a computer program, the CIE encodes the properties as Binary Decision Diagram (BDD) variables. BDDs, as discussed in R. E. Bryant, "Graph Based Algorithms for Boolean Function Manipulation", (IEEE Transactions on Computers, Vol. 35, No. 8, August, 1986), are specialized data-structures for expressing and manipulating Boolean logic. An important characteristic of BDDs is that they are canonical representations. That is, given an ordered set of Boolean variables and two different Boolean expressions (using those variables) representing the same Boolean function, the BDD graphs for both expressions will be exactly the same. For example, the BDD representations for Boolean functions $(A \wedge B \wedge C) \vee (D \wedge E)$ and $(E \wedge D) \vee (C \wedge A \wedge B)$ are exactly the same, which means that the memory pointer in the computer memory holding the BDD node data-structure is the same in both cases.

As shown in FIG. 3, a property, when associated with a pin or a core, is preferably given a value. Each property/value pair $PV_i$={Property $P_x$=Value $V_y$} is assigned a unique BDD variable $b_i$. Hence, independently of the pin or core which has the property, the same property-value pair $PV_i$ is always associated with the same BDD variable $b_i$. This can be easily implemented using two hash tables, with hash keys being the property name and value, and the hashed element being the BDD variable pointer.

A group of properties attached to a pin or core preferably corresponds to a group of property/value pairs. A group of property/value pairs is encoded as the Boolean AND function of all individual BDD variables for each pair in the group. This AND function is also preferably a BDD. More specifically, given a group of property/value pairs $PG=\{PV_1, PV_2, \ldots, PV_n\}$, the corresponding set of BDD variables is denoted $B(PG)=\{b_1, b_2, \ldots, b_n\}$. The BDD for the complete group is given by: $F(PG)=b_1 \wedge b_2 \wedge \ldots \wedge b_n$. When the property group PG is attached to a pin T, the complete BDD function F(PG) can be denoted as $F(T)|_{PG}$, or the property function F of pin T with respect to property group PG.

Given the canonical qualities of BDDs, if two property groups (e.g., in two pins) contain the same property/value pairs, their BDDs will be exactly the same, even if the orders of the property/value pairs in both groups differ. This implies that in order to check if two pins have exactly the same properties, it suffices to build the BDDs for the properties in each pin and check if the two BDDs are the same. If they are, then the properties in both pins are the same.

As an example, one may consider pins ICU__plbRequest and M0__Request and their properties as previously described. The property value pairs for all their properties are shown below:

| | | |
|---|---|---|
| BUS__TYPE = | PLB | .........global property.....BDD Variable: A |
| | | .........present on both pins |
| INTERFACE__TYPE = | MASTER | .........global...................BDD Variable: B |
| | | .........present on both pins |
| FUNCTION__TYPE = | FETCH | .........global...................BDD Variable: C |
| | | .........present on ICU__plbRequest only |
| OPERATION__TYPE = | REQUEST | .........global...................BDD Variable: D |
| | | .........present on both pins |
| DATA__TYPE = | INSTRUCTION | .........global...................BDD Variable: E |
| | | .........present on ICU__plbRequest only |
| RESOURCE__TYPE = | BUS | .........global...................BDD Variable: F |
| PIN__GROUP = | ICU | .........local....................BDD Variable: G |
| | | .........present on ICU__plbRequest only |
| PIN__GROUP = | M0 | .........local....................BDD Variable: H |
| | | .........present on M0__request only |

One can subdivide these properties into two groups of global and local properties, assign BDD variables for each property/value pair and compute the Boolean function $F_{global}$ and $F_{local}$ for each pin, are shown below:

| | |
|---|---|
| $F_{global}$ (ICU__plbRequest) = | A.B.C.D.E.F |
| $F_{local}$ (ICU__plbRequest) = | G |
| $F_{global}$ (M0 Request) = | A.B.D.F |
| $F_{local}$ (M0 Request) = | H |

As mentioned previously, these two pins may be connected together. However, their properties are not exactly the same, which results in their Boolean functions also not being exactly the same. This illustrates the fact that pins may be connected even though their properties do not match exactly. For this reason, the CIE preferably contains specialized algorithms which can compare the properties and decide whether two pins should be connected. These algorithms are described below.

In order to compare property/value pairs in different property groups in different pins or cores, it is desirable to be able to reason about the properties from a logical point of view, in a manner that can be processed by a computer program. Moreover, given that an SoC may have tens of cores with thousands of pins, and tens of thousands of properties, it is desirable to be able to automate this reasoning in an efficient way.

The CIE has algorithms that can reason about properties using Boolean Algebra. As described in the previous section, the properties and property groups are represented as Boolean equations (implemented as BDDs). The problems of property comparison and matching are formulated as Boolean operations on the BDDs representing the properties. There are two basic checks that the CIE needs to perform: "Compatibility check" and "Matching check".

Given two pins and a property group, "Compatibility check" preferably decides whether the pins are compatible with respect to the property group. For this check to return true it is not necessary for the property/value pairs to match exactly; it is sufficient for them to contain each other. More formally this can be stated as follows. Let S and T be two pins in different cores and let $F(S)|_{PG}$ and $F(T)|_{PG}$ be the corresponding property functions for pins S and T with respect to the same property group PG. Pin S is compatible with pin T if and only if $F(S)|_{PG}F(T)|_{PG}$ or $F(T)|_{PG}F(S)|_{PG}$, that is, one must be fully contained in the other. The containment operator "" is computed using BDD operations. In logic terms, A contains B if $A \vee B \equiv A$.

Using this algorithm, it can be shown that pins ICU__plbRequest and M0__Request are compatible with respect to the INTERFACE__DEF property group because $F_{global}$(M0__Request)=A.B.D.F contains $F_{global}$ (ICU__plbRequest)=A.B.C.D.E.F, hence they can be connected together. Note that when the algorithm compares pins in different cores, only the global properties are used.

For certain types of properties, it is important to determine if the property/value pairs in two pins are exactly the same. Thus, "Matching check" is a more strict check than "Compatibility check", and it can be used for determining whether two pins have the same electrical properties. For example, when comparing the operating frequencies of two pins, it is necessary to check for an exact match.

Due to the canonical properties of BDDs, two Boolean expressions representing the same Boolean function will be mapped to the same BDD. Hence, in order to check the if two property functions for two pins are the same, it is sufficient to check if their BDD representations are the same. This can be done simply by performing an equality check on the BDD pointers.

More formally, "Matching check" can be stated as follows. Let S and T be two pins in different cores and let $F(S)|_{PG}$ and $F(T)|_{PG}$ be the corresponding property functions for pins S and T with respect to the same property group PG. Pin S matches pin T with respect to property group PG if and only if $F(S)|_{PG} \equiv F(T)|_{PG}$.

The methods and algorithms described heretofore can be used for various purposes. Provided herebelow are three exemplary, non-restrictive examples of possible applications.

Figure 4:
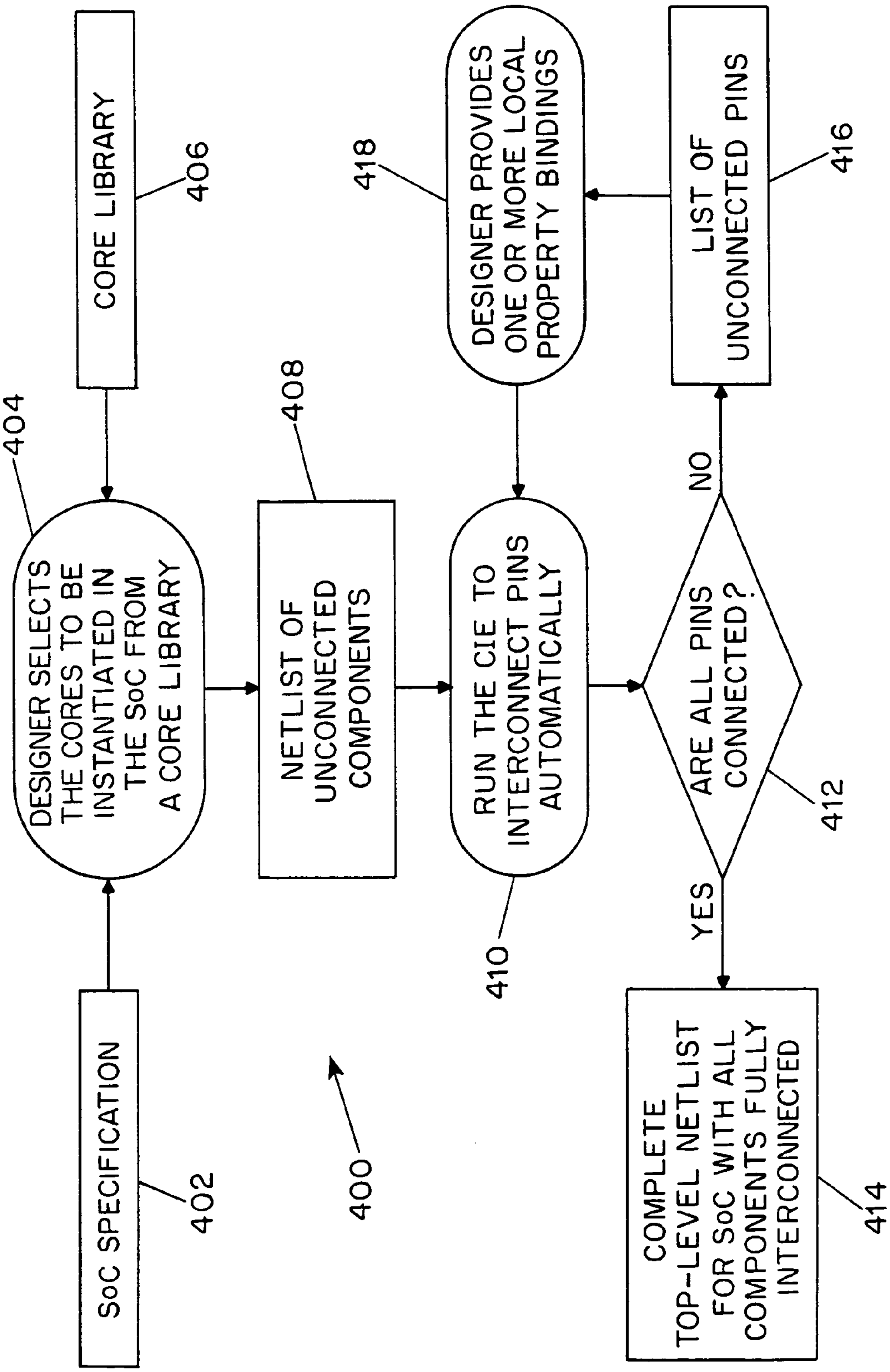
FIG. 4 is a flow diagram of steps performed during interconnection generation.

One possible application is automatic interconnection generation. The purpose of this application is to create the interconnections between two or more cores automatically generate the final top-level netlist description of the SoC. The flow diagram of this application is shown in FIG. 4.

Preferably, the designer initiates the process 400 by deciding upon which cores to use in the SoC (step 404). This decision is made based on the SoC specifications (402) and on the available core library (406). The output of this first step is a design skeleton which contains all the cores needed in the SoC but without any interconnections (in FIG. 4 this is called "netlist of unconnected components" 408). The CIE is invoked on this skeleton design at step 410 and it proceeds automatically in determining at that point which pins can unambiguously be connected together. The pseudocode describing this step (410) is shown below:

```
FOR <all components in the design> DO
    C = a component being visited;
    FOR <all pins in component C > DO
        T = a pin being visited;
        L = list_compatible_pins(T);
/* List of all pins in any other component (other than C) which have interconnection */
/* properties compatible with pin T. This list is created by applying the compatibility */
/* check (see Section III.B) between pin T and all other pins in other components. */
        connect_compatible_pins(T, L);
 /* create one or more nets and connect T to other compatible pins in list L if no */
 /* ambiguity exists. If a connection is ambiguous, leave it unconnected. */
    }
}
```

At the end of this step (410), the design will contain interconnections, but it is possible that not all pins have been connected. This may happen if a pin has two or more compatible pins with exactly the same global properties. A query is thus preferably made at step 412. If all pins are not interconnected, then a list of unconnected pins is preferably generated at step 416 and, at step 418, the designer will preferably provide one or more local property bindings.

As a non-restrictive example of an instance in which not all pins are connected (i.e., the "No" branch from step 412), pin ICU_plbRequest on the PowerPC401 core is compatible with four pins on the PLB Arbiter core, namely M0_Request, M1_Request, M2_Request and M3_Request. Similarly, all ICU related pins in the PowerPC401 are compatible with 4 pins in the PLB Arbiter (since the Arbiter can support up to 4 Masters). The CIE has a choice in deciding which Master port to use in the PLB Arbiter to connect the ICU ports. This choice can be resolved automatically by applying a default order (first M0, then M1 and so on) or by requesting the designer to provide a local property binding. By means of this binding the designer can indicate to the CIE that, for example, local property PIN_GROUP=ICU (on ICU pins in the PowerPC401) should be bound to PIN_GROUP=M3 (on M3 pins in the PLB Arbiter). With this extra information, the CIE can then decide that pin ICU_plbRequest is compatible only with pin M3_Request, and similarly for all other ICU and M3 pins in both components.

At the end of process 400, all pins in all cores should have been connected and a final fully-connected top-level netlist is generated (step 414).

Another possible application of the CIE in accordance with the present invention is automatic property verification. In this connection, the CIE can provide the designer with a flexible property verification environment. Given a design with interconnections, the designer can specify a list of properties for which exact match is required. The CIE then visits all pairs of pins which have been connected together and check that they have matching properties (for all properties in the list). This can be used, for example, to check that connected pins have the same operating frequency (which would be a property associated with each pin).

Finally, the third example of a possible application of a CIE is that of an automated designer assistant, wherein the CIE is used as an assistant to the designer during manual design. Particularly, in some situations, the designer may want to create interconnections manually, but he/she may not know exactly which pins can be connected together. In order to find that out, the designer can select a pin in a component and ask the CIE for the list of compatible pins, and then select one or more pins from the list to connect. This list can be created by applying the compatibility check (see the discussion further above regarding property comparison and matching) between the original pin and all other pins in other components.

In practice, a CIE formed in accordance with the embodiments of the present invention has been implemented in C++ and tested using the IBM Blue Logic™ Core Library and the CoreConnect™ bus architecture. A top-level SoC design was successfully generated with multiple cores and all required interconnections automatically using the CIE. Significant reductions in design complexity and design time have been demonstrated through the usage of the CIE.

Figure 5:
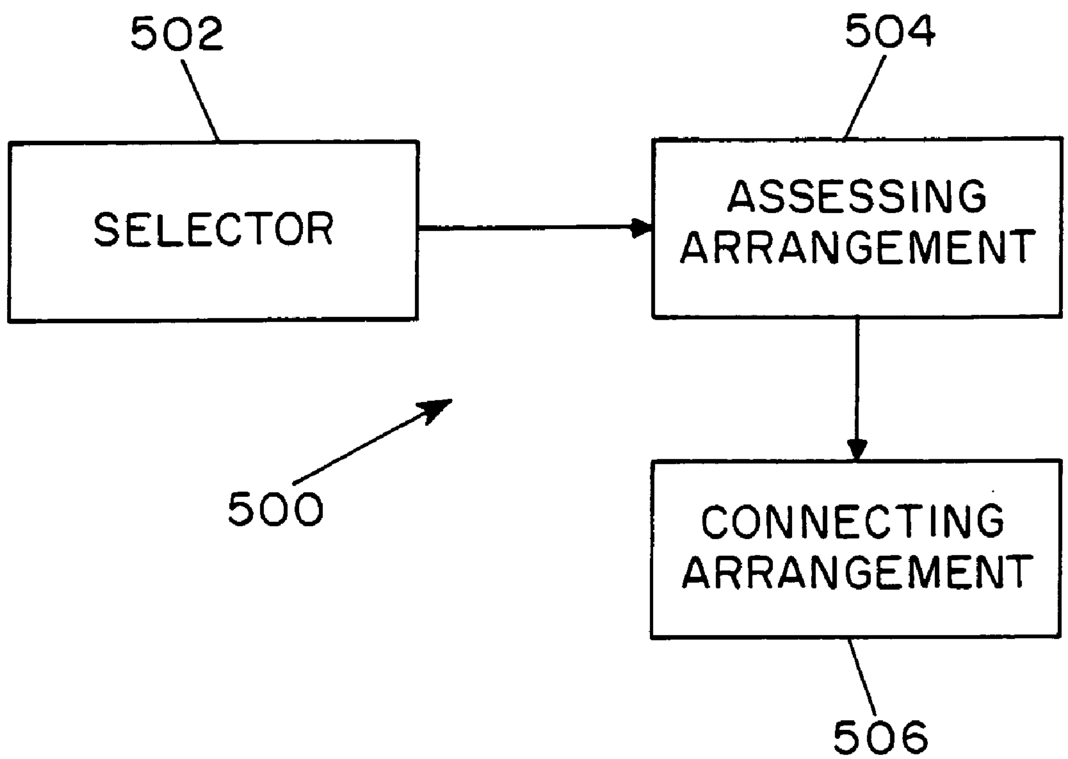
FIG. 5 is a schematic block diagram of an interconnecting system as broadly contemplated.

FIG. 5 illustrates a schematic block diagram of an interconnection system 500 as broadly contemplated in accordance with at least one presently preferred embodiment of the present invention. As shown, the system 500 may preferably include a selector 502, an assessing arrangement 504 and a connecting arrangement 506. Selector 502 is preferably selects at least two cores to be interconnected, wherein each core has at least one associated pin. Assessing arrangement 504 preferably assesses automatically the compatibility of at least one pin of at least one core with respect to at least one pin of at least one other core. Finally, connecting arrangement 506 preferably automatically interconnects the cores via establishing at least one connection between at least one pair of compatible pins.

In brief recapitulation, a CIE formed in accordance with the embodiments of the present invention contains several novel approaches for automatically interconnecting cores in SoCs. Among the useful innovations are: (1) a method for classifying cores and pins according to their functional, structural and electrical properties, (2) a method for encoding these properties in a manner that can be processed and reasoned about in a logical way by a computer program, (3) a method for analyzing and comparing properties using Boolean algebra and Binary Decision Diagrams, and (4) a method for automatically determining the correct interconnections between pins from different cores in an SoC. It should also be appreciated that a CIE formed in accordance with the embodiments of the present invention can represent one of the first approaches that can effectively realize the promise of plug-and-play of cores (IPs).

In further recapitulation, at least one embodiment of the present invention may preferably include a classifying arrangement which classifies cores and pins in terms of predetermined properties. An encoding arrangement preferably encodes such properties as binary decision diagram variables. An assessing arrangement in accordance with the present invention is preferably adapted to perform Boolean operations on said binary decision diagram variables to compare and match properties. Further, the assessing arrangement is preferably adapted to perform a compatibility check to determine whether the pins of a given pair of pins are compatible with respect to at least one given property and to perform a matching check to determine whether the pins of a given pair of pins exhibit equivalent values associated with at least one given property. A connecting arrangement preferably interconnects the cores via establishing at least one connection between at least one pair of compatible pins. A verifying arrangement is preferably provided that verifies, subsequent to interconnecting, whether the pins in at least one interconnected pair of pins have matching pin properties. Further, the verifying arrangement is preferably adapted to refer to a predetermined list of pin properties to determine whether the pins in at least one interconnected pair of pins have matching pin properties.

It is to be understood that the present invention, in accordance with at least one presently preferred embodiment, includes a selector which selects at least two cores to be interconnected, an assessing arrangement which automatically assesses the compatibility of at least one pin of at least one core with respect to at least one pin of at least one other core, and a connecting arrangement which automatically interconnects the cores via establishing at least one connection between at least one pair of compatible pins. Together, the selector, assessing arrangement and connecting arrangement may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of interconnecting cores in systems-on-chip, said method comprising the steps of:

selecting at least two cores to be interconnected, each core having at least one associated pin classified in terms of predetermined functional, structural or electrical characteristics;

automatically assessing a compatibility of at least one pin of at least one core with respect to at least one pin of at least one other core, wherein said assessing comprises performing a compatibility check to determine whether the pins of a given pair of pins are compatible with respect to at least one given characteristic;

automatically interconnecting said cores via establishing at least one connection between at least one pair of compatible pins;

prior to said selecting step, classifying said cores and said pins in terms of predetermined characteristics; and further comprising, prior to said selecting step, encoding said characteristics as binary decision diagram variables.

2. The method according to claim 1, wherein said assessing step comprises performing Boolean operations on said binary decision diagram variables to compare and match characteristics.

3. A method of interconnecting cores in systems-on-chip, said method comprising the steps of:

selecting at least two cores to be interconnected, each core having at least one associated pin classified in terms of predetermined functional, structural or electrical characteristics;

automatically assessing a compatibility of at least one pin of at least one core with respect to at least one pin of at least one other core, wherein said assessing comprises performing a corruptibility check to determine whether the pins of a given pair of pins are compatible with respect to at least one given characteristic;

automatically interconnecting said cores via establishing at least one connection between at least one pair of compatible pins;

prior to said selecting step, classifying said cores and said pins in terms of predetermined characteristics; and wherein said assessing step further comprises performing a matching check to determine whether the pins of a given pair of pins exhibit equivalent values associated with at least one given characteristic.

4. The method according to claim 3, further comprising:

automatically assessing, subsequent to said interconnecting step, whether all pins are connected;

if at least two pins are not connected, thereafter applying a protocol to establish at least one additional connection between at least one additional pair of compatible pins.

5. The method according to claim 1, further comprising:

subsequent to said interconnecting step, automatically verifying whether the pins in at least one interconnected pair of pins have matching pin characteristics.

6. The method according to claim 5, further comprising:

prior to said verifying step, establishing a list of pin characteristics for which the match between the pins in at least one pair of pins is required;

said verifying step comprising the step of referring to said list of pin characteristics to determine whether the pins in at least one interconnected pair of pins have matching pin properties.

7. A system for interconnecting cores in systems-on-chip, said system comprising:

a selector which selects at least two cores to be interconnected, each core having at least one associated pin classified in terms of predetermined functional, structural or electrical characteristics;

an assessing arrangement which automatically assesses a compatibility of at least one pin of at least one core with respect to at least one pin of at least one other core, wherein said assessing arrangement is adapted to perform a compatibility check to determine whether the pins of a given pair of pins are compatible with respect to at least one given characteristic;

a connecting arrangement which automatically interconnects said cores via establishing at least one connection between at least one pair of compatible pins;

a classifying arrangement which classifies said cores and said pins in terms of predetermined characteristics; and further comprising an encoding arrangement which encodes said characteristics as binary decision diagram variables.

8. The system according to claim 7, wherein said assessing arrangement is adapted to perform Boolean operations on said binary decision diagram variables to compare and match characteristics.

9. A system for interconnecting cores in systems-on-chip, said system comprising:

a selector which selects at least two cores to be interconnected, each core having at least one associated pin classified in terms of predetermined functional, structural or electrical characteristics;

an assessing arrangement which automatically assesses a compatibility of at least one pin of at least one core with respect to at least one pin of at least one other core, wherein said assessing arrangement is adapted to perform a compatibility check to determine whether the pins of a given pair of pins are compatible with respect to at least one given characteristic;

a connecting arrangement which automatically interconnects said cores via establishing at least one connection between at least one pair of compatible pins; and a classifying arrangement which classifies said cores and said pins in terms of predetermined characteristics, wherein said assessing arrangement is further adapted to perform a matching check to determine whether the pins of a given pair of pins exhibit equivalent values associated with at least one given characteristic.

10. The system according to claim 9, further comprising a verifying arrangement which verifies, subsequent to interconnecting, whether the pins in at least one interconnected pair of pins have matching pin characteristics.

11. The system according to claim 10, wherein said verifying arrangement is adapted to refer to a predetermined list of pin characteristics to determine whether the pins in at least one interconnected pair of pins have matching pin characteristics.

12. A program storage device readable by machine, tangibly embodying a program of instructions executable by the machine to perform method steps for interconnecting cores in systems-on-chip, said method comprising:

selecting at least two cores to be interconnected, each core having at least one associated pin classified in terms of predetermined functional, structural or electrical characteristics;

automatically assessing a compatibility of at least one pin of at least one core with respect to at least one pin of at least one other core, wherein said assessing comprises performing a compatibility check to determine whether the pins of a given pair of pins are compatible with respect to at least one given characteristic;

automatically interconnecting said cores via establishing at least one connection between at least one pair of compatible pins;

prior to said selecting step, classifying said cores and said pins in terms of predetermined characteristics; and wherein said assessing step further comprises performing a matching check to determine whether the pins of a given pair of pins exhibit equivalent values associated with at least one given characteristic.

* * * * *

UNITED STATES PATENT AND TRADEMARK OFFICE

CERTIFICATE OF CORRECTION

PATENT NO. : 6,993,740 B1
APPLICATION NO. : 09/542024
DATED : April 3, 2000
INVENTOR(S) : Bergamaschi et al.

It is certified that error appears in the above-identified patent and that said Letters Patent is hereby corrected as shown below:

Column 12, line 16, “a” should read -- the --

Column 12, line 19, “corruptibility” should read -- compatibility --

Signed and Sealed this

Tenth Day of April, 2007

JON W. DUDAS

*Director of the United States Patent and Trademark Office*

UNITED STATES PATENT AND TRADEMARK OFFICE

CERTIFICATE OF CORRECTION

PATENT NO. : 6,993,740 B1
APPLICATION NO. : 09/542024
DATED : January 31, 2006
INVENTOR(S) : Bergamaschi et al.

It is certified that error appears in the above-identified patent and that said Letters Patent is hereby corrected as shown below:

Column 12, line 16, “a” should read -- the --

Column 12, line 19, “corruptibility” should read -- compatibility --

This certificate supersedes Certificate of Correction issued April 10, 2007.

Signed and Sealed this

Eighth Day of May, 2007

JON W. DUDAS

*Director of the United States Patent and Trademark Office*